United States Patent
Bott et al.

(10) Patent No.: US 7,245,581 B2
(45) Date of Patent: Jul. 17, 2007

(54) METHOD AND APPARATUS FOR NORMALIZING AMPLITUDES OF ORTHOGONAL FREQUENCY DIVISION MULTIPLEX (OFDM) SIGNALS

(75) Inventors: Rainer Bott, Andechs (DE); Karlheinz Pensel, Freising (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1086 days.

(21) Appl. No.: 10/203,355

(22) PCT Filed: Mar. 16, 2001

(86) PCT No.: PCT/EP01/03018

§ 371 (c)(1),
(2), (4) Date: Aug. 9, 2002

(87) PCT Pub. No.: WO01/74019

PCT Pub. Date: Oct. 4, 2001

(65) Prior Publication Data

US 2003/0002434 A1 Jan. 2, 2003

(30) Foreign Application Priority Data

Mar. 28, 2000 (DE) .................. 100 15 257

(51) Int. Cl.
*H04J 11/00* (2006.01)
*H04L 27/08* (2006.01)
(52) U.S. Cl. .................... 370/203; 375/345
(58) Field of Classification Search ................ 370/203, 370/210
See application file for complete search history.

(56) References Cited

U.S. PATENT DOCUMENTS

| 4,179,586 | A | | 12/1979 | Mathews, Jr. et al. |
| 4,943,980 | A | | 7/1990 | Dobson et al. |
| 6,038,261 | A | * | 3/2000 | Mestdagh ................. 375/285 |
| 6,081,502 | A | * | 6/2000 | Paneth et al. .............. 370/210 |
| 6,301,268 | B1 | * | 10/2001 | Laroia et al. ............... 370/481 |
| 6,314,146 | B1 | * | 11/2001 | Tellado et al. .............. 375/346 |
| 6,363,127 | B1 | * | 3/2002 | Heinonen et al. ........... 375/345 |

(Continued)

FOREIGN PATENT DOCUMENTS

DE 34 11 962 C2 10/1984

(Continued)

OTHER PUBLICATIONS

Owano et al., "Linearized Contant Peak-Power Coded OFDM Transmission for Broadband Wireless Access Systems", IEICE Trans. Commun., Dec. 12, 1999; pp. 1932-1938, vol. E82-B, No. 12.

*Primary Examiner*—Hassan Kizou
*Assistant Examiner*—Brian Roberts
(74) *Attorney, Agent, or Firm*—Ditthavong Mori & Steiner, P.C.

(57) ABSTRACT

A method and apparatus for processing Orthogonal Frequency Division Multiplex (OFDM) signals is described, in which OFDM signals are conditioned in an OFDM modulated on the transmitter side for each symbol of a data stream to be transmitted and sent as a multicarrier signal. For each OFDM signal, the maximum amplitude of a block is determined for least one block and then normalized to a system-specific, transmitter-specific maximum value.

18 Claims, 1 Drawing Sheet

U.S. PATENT DOCUMENTS

| | | | |
|---|---|---|---|
| 6,556,557 B1 * | 4/2003 | Cimini et al. | 370/342 |
| 6,853,632 B1 * | 2/2005 | Verma et al. | 370/343 |

FOREIGN PATENT DOCUMENTS

| | | |
|---|---|---|
| DE | 33 28 111 A1 | 2/1985 |
| DE | 44 41 323 A1 | 5/1996 |
| DE | 196 25 054 A1 | 1/1998 |
| DE | 196 35 813 A1 | 3/1998 |
| DE | 198 38 295 A1 | 6/1999 |
| DE | 198 08 993 A1 | 9/1999 |
| DE | 198 50 642 A1 | 5/2000 |
| EP | 0 932 285 A2 | 7/1999 |
| EP | 1 041 763 A2 | 4/2000 |
| EP | 0 932 285 A3 | 8/2001 |
| JP | 11074862 | 3/1999 |
| JP | 2000115123 | 4/2000 |
| WO | WO 98/10567 | 3/1998 |
| WO | WO 99/53665 | 10/1999 |

* cited by examiner

METHOD AND APPARATUS FOR NORMALIZING AMPLITUDES OF ORTHOGONAL FREQUENCY DIVISION MULTIPLEX (OFDM) SIGNALS

FIELD OF THE INVENTION

The invention relates to a method of transmitting OFDM signals and also of demodulating such signals in the receiver.

BACKGROUND OF THE INVENTION

OFDM (orthogonal frequency division multiplex) systems or systems derived therefrom, for example COFDM (coded OFDM) systems, are used for data transmission in modern digital technology. In this technology, the digital data stream is converted into complex-valued symbols by mapping prior to emission and split up into a multiplicity of subsignals, each of which is transmitted discretely on a separate carrier. In the case of the DVB-T system, for example, 1705 or 6817 such individual carriers are used. In the receiver, these subinformation items are combined again to form a total information item of the transmitter-end digital data stream. An OFDM system is described in greater detail in Hermann Rohling, Thomas May, Karsten Bruninghaus and Rainer Grunheid, Broad-Band OFDM Radio Transmission for Multimedia Applications, Proceedings of the IEEE, Vol. 87, No. 10, October 1999, pages 1778 ff.

Such OFDM signals do not have a constant envelope since, as a result of the addition of the individual carriers, their phase position depends on the modulating signal and the amplitude is subject to severe fluctuations even during a symbol duration or block duration. In the case of a large number of such individual carriers, the PAPR (peak-to-average power ratio) or the CREST factor may be substantially above the mean signal power and consequently substantially greater than unity. This imposes substantial dynamic requirements on the digital/analog converter or amplifier in the transmitter and on the corresponding components in the receiver since they have to provide an appropriate dynamic reserve accompanied by high linearity. At a low loading level with the mean signal power, the operation of the components is therefore very inefficient. The PAPR factor of an OFDM signal is in general different for every block transmitted, whereas the mean power remains the same. Overloading of the transmitter or receiver components results in substantial signal distortions, which means an increased symbol error rate or bit error rate.

There is therefore a need for conditioning such OFDM signals, in which such overloading or underloading is avoided.

SUMMARY OF THE INVENTION

This and other needs are addressed by the invention, in which the maximum amplitude of the consecutive blocks of each of the OFDM signals is normalized at the transmitter end to a transmitter-specific maximum value, i.e. the respective measured maximum amplitude value per block is either reduced or increased in such a way that it corresponds to said maximum value predetermined by the structure of the transmitter and neither exceeds it nor drops below it. At the same time, the amplitude values of the total block are correspondingly increased or reduced. A measure of the normalization to the transmitter-specific maximum value is the maximum amplitude value determined for each block. This avoids an overloading of the analog transmitter components, such as digital/analog converters or amplifiers. At the same time a corresponding overloading of the analog receiver components is also avoided, it having been found advantageous, in accordance with some embodiments of the invention, also to undertake in combination therewith at the same time also a shift in the determined maximum amplitude value such that the latter occurs in each case at the start of a block and can consequently be automatically corrected by the automatic receiver control system. This measure accordingly to demodulation of OFDM signal can at the same time be applied not only in combination with transmitting OFDM signals, but can also be applied on its own even to avoid overloading at the receiver end.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWING

The invention is explained in greater detail below by reference to FIG. 1, which is a diagrammatic drawing based on an exemplary embodiment.

DETAILED DESCRIPTION OF THE PREFERRED EMBODIMENT

Figure 1:
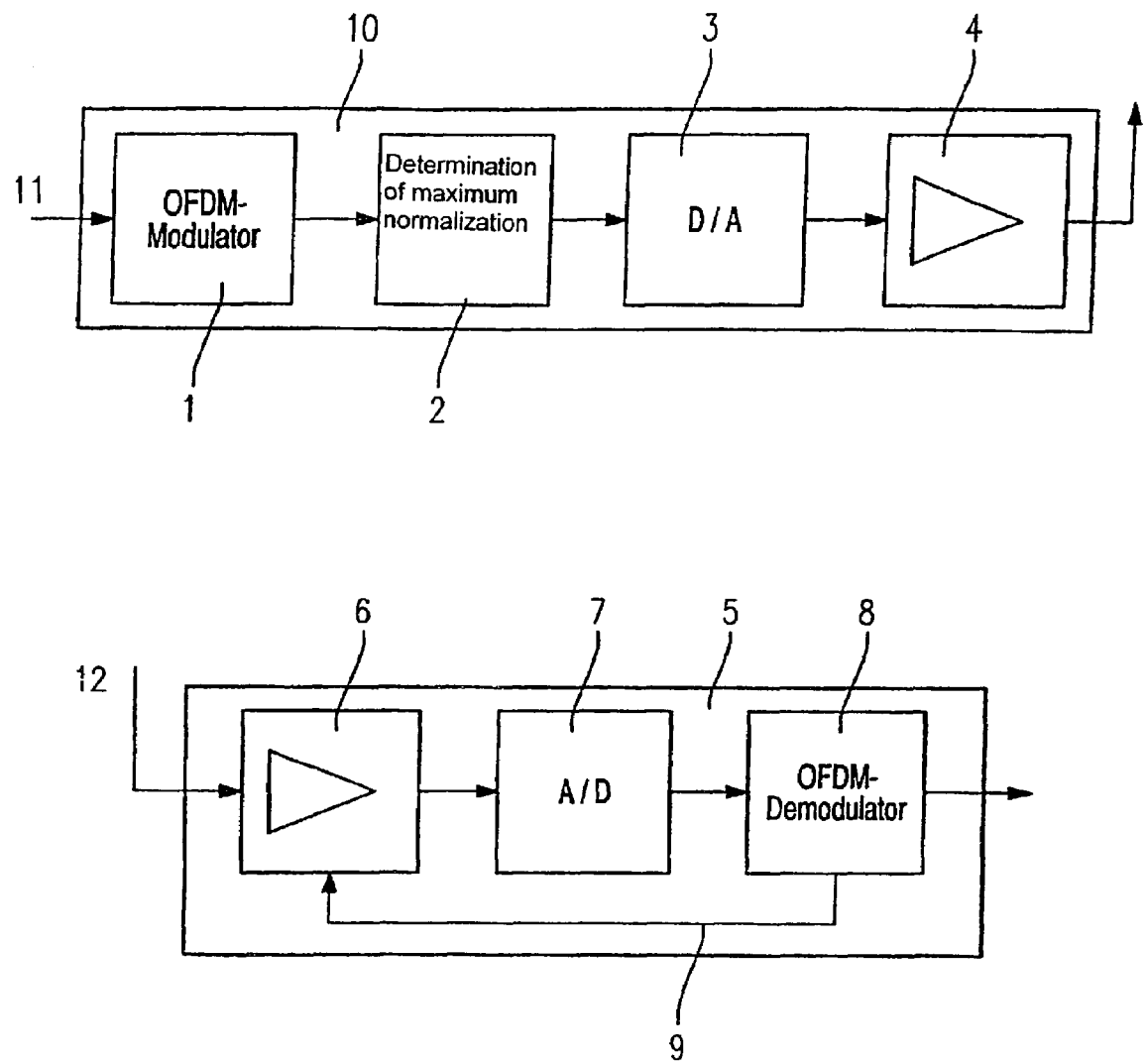

A data stream 11 to be transmitted is conditioned in a transmitter 10 in a known manner by digital signal processing in an OFDM modulator 1 in the base band. The maximum amplitude value for each block is then determined for each of the individual OFDM signals in a digital signal processor 2. In addition, the transmitter-specific maximum value M is then inputted that is system-imposed by the components, such as digital/analog converters, amplifiers and the like and with which the digital/analog converter is still maximally drivable without at the same time being overloaded. The measured maximum amplitude value for each block is normalized to said transmitter-specific maximum value M, i.e. the instantaneous respective signal amplitude within the block is increased or reduced in such a way that its maximum value corresponds to said transmitter-specific maximum value M. This achieves the result that the maximum amplitude for each block corresponds in each case to said transmitter-specific maximum value M. This avoids an overloading or underloading of a downstream digital/analog converter 3 or of a downstream analog amplifier 4, and these transmitter components operate at optimum efficiency and always in the linear range.

The maximum amplitude for each block could also be determined in the analog section of the transmitter prior to amplification, but determination in the still digital section of signal conditioning is more advantageous.

The determination of the maximum amplitude can be determined separately for each block, and the normalization to the transmitter-specific maximum value M then takes place separately for each block. Another possibility is to determine the maximum amplitude of a plurality of consecutive blocks in a temporally variable manner and then to normalize or to scale this maximum amplitude value consequently determined from a plurality of blocks. This may take place, for example, consecutively in blocks for a plurality of combined blocks in each case or, alternatively, also in a temporally variable manner, i.e. continuously for a plurality of combined symbols in each case.

The OFDM signals conditioned in this way also avoid a corresponding overloading or underloading of the receiver components in a receiver 5. A received OFDM signal 12 is amplified in an amplifier 6 having automatic gain control (AGC), digitized in an analog/digital converter 7 and then demodulated in a OFDM demodulator 8 by digital signal conditioning. Since the maximum amplitude value for each block does not always occur at the start of the temporal course of a block in the individual OFDM signals, the automatic gain control of the amplifier 6 must be adjusted in such a way that an overloading or underloading of the analog/digital converter is avoided. This is possible only as a result of a compromise in the level of gain so that a certain dynamic reserve is still available. This reserve is necessary to prevent noise peaks resulting in overloading.

In accordance with a development of the invention, therefore, not only the maximum amplitude of the OFDM signals is determined for each block at the transmitter end, but their temporal position and the OFDM signals are then also shifted in each case in such a way that the maximum amplitude for each block occurs in each case at the start of a block. The automatic receiver control system 6 is designed, in addition, as peak-value controller. This achieves the result that the automatic gain control commences immediately directly at the start of a block and the amplifier is controlled to said maximum amplitude value. In addition, the gain control is designed in such a way that it is held constant, at least during the entire block, at a receiver-specific maximum value set by the receiver. For this purpose, the peak-value controller of the amplifier 6 receives, via the operative connection 9, a corresponding information item from the demodulator 8 indicating when control is to take place to the respective peak value and when the gain is to be kept constant.

To compensate for the signal distortions occurring in a transmission channel, a buffer period that is temporally at least as great as the duration of the channel pulse response is frequently additionally introduced at the start of a block in such OFDM systems. In these cases, it is advantageous to shift the maximum amplitude value in the block in such a way that the maximum amplitude is likewise situated in said buffer period so that the automatic control signal in the receiver can already measure the peak value of the signal in the buffer period.

Instead of the automatic gain control in the analog section of the receiver, the latter could also be performed in the digital section downstream of the analog/digital converter 7. A partly analog and digital gain control is also conceivable. Since the maximum in the amplitude of a block is situated in each case at the start of the block, the clock recovery can also be correspondingly improved by feeding the temporal position of the maximum as additional information to the clock recovery device.

While the present invention has been described in connection with a number of embodiments and implementations, the present invention is not so limited but covers various obvious modifications and equivalent arrangements, which fall within the purview of the appended claims.

What is claimed is:

1. A method of processing Orthogonal Frequency Division Multiplex (OFDM) signals that are conditioned at a transmitter end in an OFDM modulator for each symbol of the data stream to be transmitted and are emitted as a multicarrier signal, comprising:
    determining, in the transmitter end, a maximum amplitude of each OFDM signal for at least one block, and
    normalizing the amplitude to a system-imposed transmitter-specific maximum value,
    wherein the OFDM signals are demodulated in a receiver in which the OFDM signals are amplified in an amplifier having automatic gain control and demodulated in an OFDM demodulator,
    wherein, in the transmitter, said maximum amplitude is shifted to occur for each symbol at the respective symbol start.

2. A method according to claim 1, wherein:
    the signals conditioned in the OFDM modulator are amplified after digital/analog conversion in an amplifier, and
    the maximum amplitude is determined and normalized upstream of the digital/analog conversion.

3. A method according to claim 1, wherein the maximum amplitude is determined and normalized separately for each block of the OFDM signals.

4. A method according to claim 1, wherein:
    the maximum amplitude is determined of a plurality of consecutive blocks of each OFDM signal, and
    the maximum amplitude value of the block actually transmitted is normalized to said maximum amplitude determined of the plurality of the consecutive blocks.

5. A method according to claim 1, wherein the automatic gain control in the receiver is designed as peak-value controller.

6. A method according to claim 5, wherein the automatic control in the receiver is designed to keep the gain constant at a receiver specific maximum value for at least one symbol duration or block duration.

7. A method according to claim 1, wherein the automatic gain control is controlled as a function of the OFDM demodulator to operate as a peak-value controller if the receiver-specific maximum value is exceeded, and, if below said receiver-specific maximum value, to operate as a constant amplitude controller.

8. A method according to claim 1, further comprising:
    providing a buffer period at a start of a symbol, wherein said normalizing of the maximum amplitude value occurs in the buffer period of the block.

9. An Orthogonal Frequency Division Multiplex (OFDM) transmitter, comprising:
    a modulator configured for conditioning each symbol of a data stream to generate respective OFDM signals; and
    a signal processor configured for:
        determining a maximum amplitude of each of the OFDM signals for at least one block, and
        normalizing the amplitude to a system-imposed transmitter-specific maximum value,
        wherein the signal processor is further configured for shifting the maximum amplitude to occur for each symbol at the respective symbol start.

10. An OFDM transmitter according to claim 9, further comprising:
    a digital-to-analog converter coupled to an output of the signal processor, and
    an amplifier coupled to an output of the digital-to-analog converter.

11. An OFDM transmitter according to claim 9, wherein the maximum amplitude is determined and normalized separately for each block of the OFDM signals.

12. An OFDM transmitter according to claim 9, wherein:
the maximum amplitude is determined of a plurality of consecutive blocks of each OFDM signal, and
the maximum amplitude value of the block actually transmitted is normalized to said maximum amplitude determined of the plurality of the consecutive blocks.

13. An OFDM transmitter according to claim 9, wherein an additional buffer period is provided at a start of a symbol, and said normalizing of the maximum amplitude value occurs in the buffer period of the block.

14. An Orthogonal Frequency Division Multiplex (OFDM) receiver, comprising:
amplifying the OFDM signals in an amplifier having automatic gain control; and
demodulating the amplified OFDM signals in an OFDM demodulator,
wherein the OFDM signals are conditioned so that the maximum amplitude of each OFDM signal is determined for at least one block and said maximum amplitude is shifted to occur for each symbol at the respective symbol start.

15. An OFDM receiver according to claim 14, wherein the automatic gain control in the receiver is designed as peak-value controller.

16. An OPDM receiver according to claim 15, wherein the automatic control in the receiver is designed to keep the gain constant at a receiver specific maximum value for at least one symbol duration or block duration.

17. An OFDM receiver according to claim 14, wherein the automatic gain control is controlled as a function of the OFDM demodulator to operate as a peak-value controller if the receiver-specific maximum value is exceeded, and, if below said receiver-specific maximum value, to operate as a constant amplitude controller.

18. An OFDM transmitter according to claim 14, wherein a buffer period is provided at a start of a symbol, and said normalizing of the maximum amplitude value occurs in the buffer period of the block.

* * * * *